United States Patent [19]
Burke et al.

[11] Patent Number: 5,908,001
[45] Date of Patent: Jun. 1, 1999

[54] CENTER PLATE ASSEMBLY BEARING LINER

[75] Inventors: Michael K. Burke, Wheaton; Richard F. Murphy, Batavia, both of Ill.

[73] Assignee: Zeftek, Inc., Montgomery, Ill.

[21] Appl. No.: 08/926,105

[22] Filed: Sep. 9, 1997

[51] Int. Cl.[6] .................................................. B61F 5/16
[52] U.S. Cl. .................................. 105/199.4; 384/422
[58] Field of Search .................. 105/199.4; 384/422, 384/297, 420, 462, 476, 909

[56] References Cited

U.S. PATENT DOCUMENTS

| | | | |
|---|---|---|---|
| 4,188,888 | 2/1980 | Cooper et al. | 105/199.4 |
| 4,237,792 | 12/1980 | Somers | 105/199.4 |
| 4,241,667 | 12/1980 | Wulff | 384/422 |
| 4,258,960 | 3/1981 | Harris | 384/297 |
| 4,263,361 | 4/1981 | Hodes et al. | |
| 4,289,077 | 9/1981 | Kleykamp et al. | |
| 4,341,162 | 7/1982 | Mathieu | 105/199.4 |
| 4,483,254 | 11/1984 | Meadows | |
| 5,443,015 | 8/1995 | Rudibaugh et al. | 105/199.4 |
| 5,558,025 | 9/1996 | Kanjo | 105/199.4 |

*Primary Examiner*—Mark T. Le
*Assistant Examiner*—Robert J. McCarry, Jr.
*Attorney, Agent, or Firm*—Lloyd L. Zickert

[57] ABSTRACT

A self-lubricating plastic center plate assembly bearing liner for placement between a body bolster center plate and a truck bolster center plate of a center plate assembly in a railroad car, wherein the liner is configured to substantially mate with the center plates and includes a body having an integrally formed electrically conductive ring of plastic material which provides electrical continuity between the plates in the center plate assembly.

14 Claims, 2 Drawing Sheets

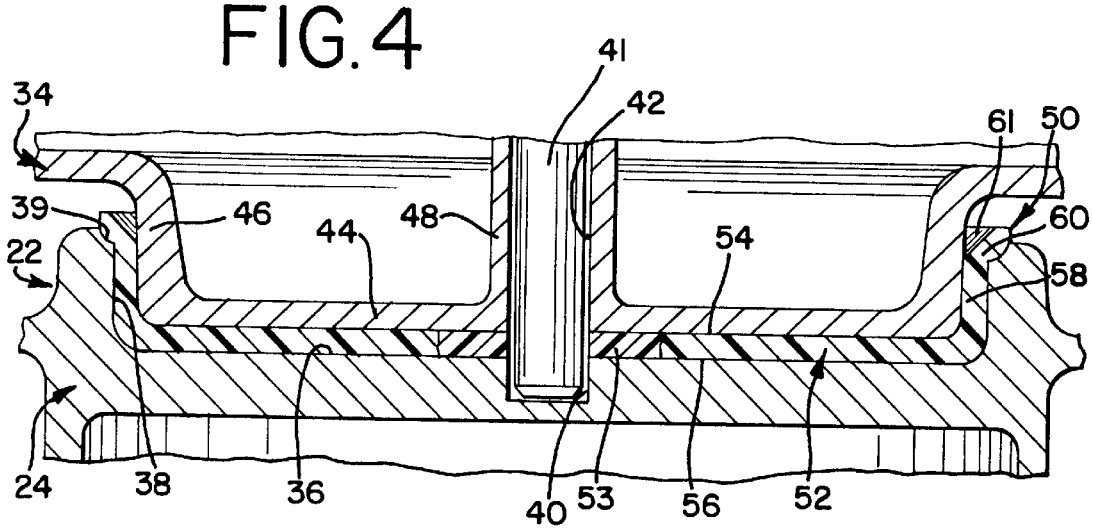
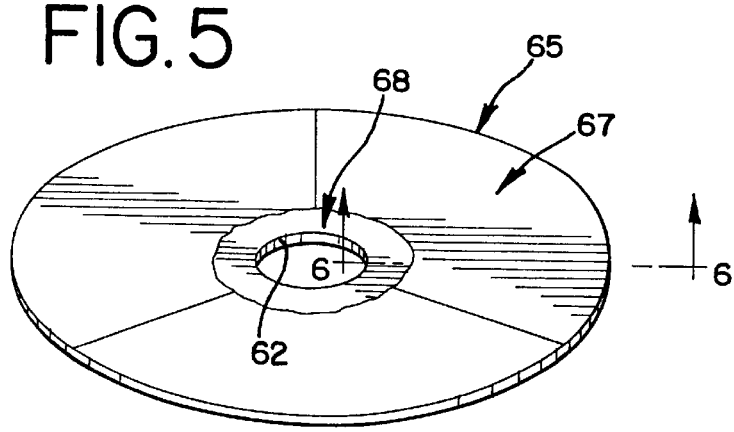
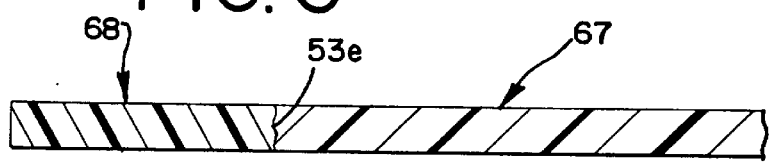

CENTER PLATE ASSEMBLY BEARING LINER

This invention relates in general to a center plate assembly bearing liner for a railroad car, and more particularly to a plastic center plate assembly bearing liner for placement between a body bolster center plate and a truck bolster center plate, wherein the liner includes a load-bearing portion and a conductive portion for providing electrical conductivity between the truck bolster and the body bolster.

BACKGROUND OF THE INVENTION

Conventional railroad cars are generally constructed with a body having an underframe that includes a pair of spaced-apart body bolsters resting on and rotatably or swivelly received by a pair of spaced-apart trucks that rollingly support the car along railroad tracks. Each body bolster is swivelly or rotatably received by a truck bolster by a conventional center plate assembly that includes a body bolster center plate on the underframe, a truck bolster center plate on the truck, and a liner or wear element between the center plates. A conventional kingpin extends through the center plates.

Heretofore, it has been well known in the railroad industry to use manganese steel liners as wear elements in center plate assemblies. These steel liners, of course, provide electrical continuity between the body bolster center plate and the truck bolster center plate or bowl. It has also been known to employ plastic center plate wear liners between the body bolster center plate, and the truck bolster center plate to reduce wear on these parts by eliminating the metal-to-metal contact incurred with steel liners as well as providing self-lubrication between these parts. These liners have included both horizontal or disk-shaped liners, as well as cup-shaped or bowl-shaped liners.

However, it is necessary to retain some metal-to-metal contact to create electrical continuity or conductivity between the plates. This continuity is important because it provides a ground for the car body, thereby eliminating the buildup of static electricity on the car body. Additionally, the electric continuity provides the ability to obtain signals through the tracks. The metal-to-metal contact that created the continuity in plastic wear liners has been generally provided by brass, copper, or other electrically conductive studs or pins placed in the plastic liner extending between both sides to engage both plates which provide the electrical continuity but increase the friction between the plates. Moreover, the heads of the studs or pins tend to break or wear off and then become less effective to provide electrical continuity.

It has also been known to add conductive fillers or steel mesh to plastic materials to make them electrically conductive. However, the addition of conductive fillers, such as carbon black or fibers, materially weakens the integrity and wearability of the plastic.

SUMMARY OF THE INVENTION

The present invention overcomes the above problems in providing a self-lubricating plastic center plate assembly bearing liner which does not need any metal pins and which includes only a limited portion that is electrically conductive to provide electrical continuity or conductivity between the truck bolster plate and the body bolster plate, thereby preventing the build-up of static electricity in the car.

The liner includes a load-bearing portion of enhanced ultra-high molecular weight polyethylene that can withstand abrasion and resist cold flow. Ultra-high molecular weight polyethylene will be hereafter referred to as UHMWPE. The liner includes an annular conductive portion integrally formed centrally of the load-bearing portion. Reinforcing particles are provided in the load-bearing portion, while conductive particles are provided in the conductive portion. The word "particle" used herein is intended to include granules and/or fibers of any suitable type. For example, the load-bearing portion could have glass particles, while the conductive portion could have carbon particles. The UHMWPE in the liner of the present invention is made by Industries PPD of Sherbrooke, Quebec, and sold under the trademark "Resistall". The load-bearing portion includes glass fillers or particles to reinforce the UHMWPE, while the conductive portion includes carbon particles or fillers to make this portion conductive.

The reinforcing particle UHMWPE is preformed as pie-shaped segments in pill molds, while the conductive particle UHMWPE is preformed as an annular member in a pill mold. Thereafter, the segments are placed together in the form of a liner in a mold and subjected to high pressure and heat to fuse the entire assembly into a monolithic structure. Thus, the liner is finally compression molded under heat and pressure which essentially fuses the segments together and forms a one-piece unit. Molding under heat and pressure is also referred to as forging a part.

The present invention thereby provides a forged self-lubricating plastic center plate assembly bearing liner without metal pins or studs which fully utilizes the self-lubricating characteristics of a plastic liner, while including an electrically conductive portion that provides the electrical continuity between the truck bolster plate and the body bolster plate, and which is capable of resisting cold flow and abrasion over the wear period of the liner, thereby providing a substantially longer life than heretofore known liners.

It is therefore an object of the present invention to provide a plastic center plate assembly bearing liner for placement in a center plate assembly between the body bolster center plate and the truck bolster plate of a railroad car, wherein the liner includes a body having at least a portion being electrically conductive for providing electrical continuity between the truck bolster and the body bolster to avoid static build-up in the car.

Another object of the present invention is to provide a molded self-lubricating UHMWPE bearing liner for a center plate assembly that includes at least a portion having an electrically conductive filler to produce electrical conductivity for the assembly, wherein the electrically conductive portion wears at substantially the same rate as the load-bearing portion.

A further object of the invention is to provide a metal pin-free plastic liner that is electrically conductive to provide electrical continuity in the center plate assembly and which is formed from a plurality of pill molded segments that are assembled in the shape of a liner and cured and fused together under heat and pressure.

A still further object of the invention is in a method of making a forged liner having a conductive portion.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 4 is a transverse sectional view taken through the center plate assembly and illustrating the liner of FIGS. 2 and 3 disposed between the underframe bolster center plate and the truck bolster center plate;

FIG. 5 is a perspective view of a horizontal liner or a disk-shaped liner, which is another embodiment of the invention; and FIG. 6 is an enlarged sectional view taken along lines 6—6 of FIG. 5.

DESCRIPTION OF THE INVENTION

Figure 1:
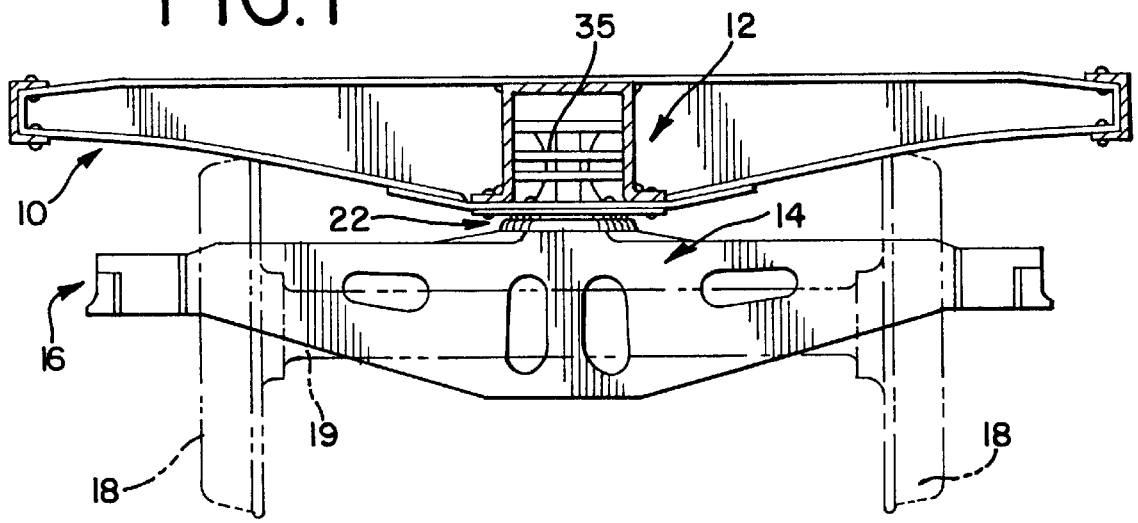
FIG. 1 is a somewhat diagrammatic transverse cross-sectional view taken through the underframe of a railroad car illustrating a center plate assembly on a body bolster and a truck bolster of a railroad car, and illustrating the truck wheels and axle in phantom and having the truck side frames omitted for clarity purposes.

Referring now to the drawings, and particularly to FIG. 1, a standard railroad car underframe 10 includes a conventional car body bolster 12 resting on and swivelly or rotatably received by a conventional truck bolster 14 of a car truck 16. The truck 16 includes wheels 18 on an axle 19 all in phantom, which would engage standard railroad tracks. The truck 16 is attached to the truck bolster 14 and would also include side frames that have been omitted for purposes of clarity.

A standard center plate assembly 22 is provided between the truck bolster and the body bolster. As illustrated more particularly in FIG. 4, the center plate assembly 22 includes a truck bolster center plate 24 that is attached to or integrally formed with the truck bolster 14, and a body bolster center plate 34 that is attached to a center filler 35 (FIG. 1) which is in turn suitably attached to the body bolster 12 in a conventional manner.

Referring again to FIG. 4, the bolster center plate 24 is in the form of a bowl having a generally smooth horizontally disposed circular floor base wall or bottom 36 and a generally smooth vertically disposed circumambient upstanding side wall 38. At the upper end of the inner surface of the side wall 38 a conventional annular j-groove 39 may be provided which when the center plate assembly is fitted with a manganese steel liner would receive welding material for welding the liner to the bolster center plate. The floor 36 includes a centrally positioned circular aperture or blind bore 40 for receiving the lower end of a kingpin or kingbolt 41 that extends upwardly through a central bore 42 in the body center plate 34. The body center plate 34 includes a horizontally disposed circular base 44 connected to a generally vertically disposed circumambient upstanding perimeter wall 46 and to a vertically extending tubular wall 48 within which is the bore 42 that receives the kingpin 41. The kingpin 41 defines the rotational interrelationship between the center plates of the center plate assembly.

Figure 2:
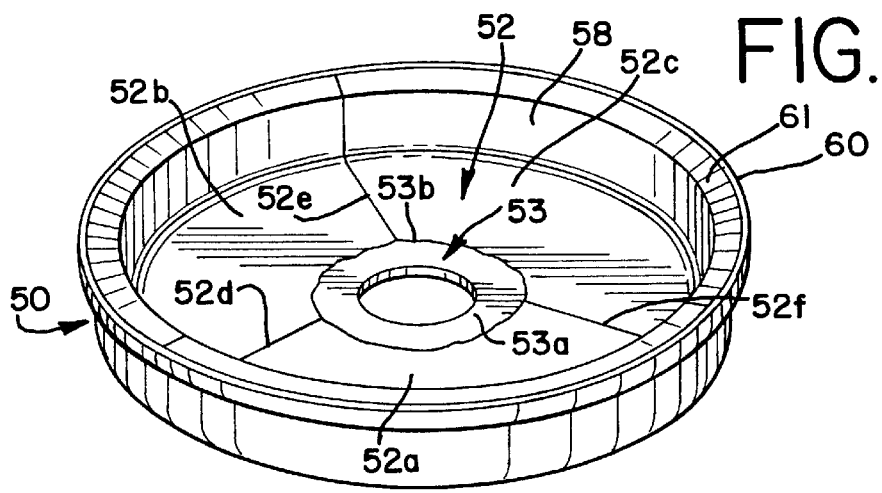
FIG. 2 is a perspective view of the one form of the liner of the present invention when looking at the liner from the top.
Figure 3:
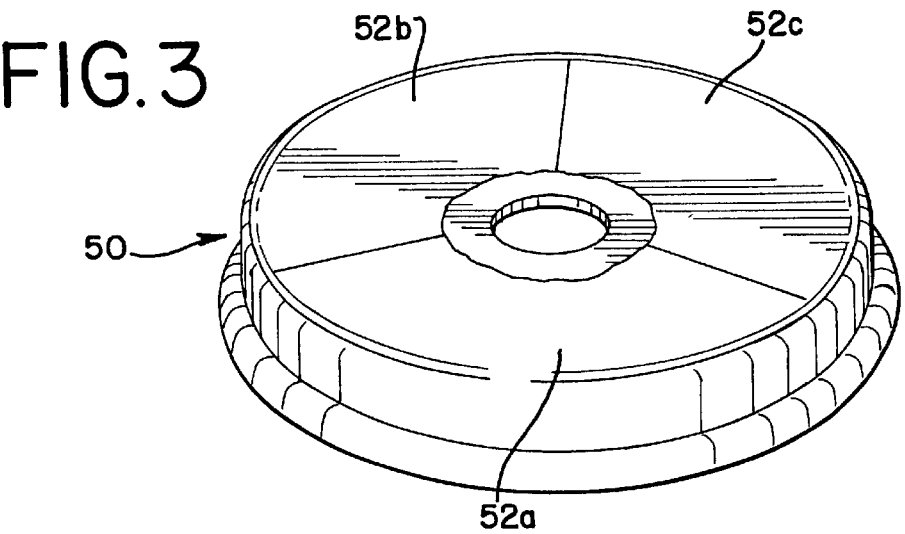
FIG. 3 is a bottom perspective view of the liner of FIG. 2.

The bowl-shaped liner of the present invention, which is arranged between the center plates in FIG. 4, is generally indicated by the numeral 50 and is also shown in FIGS. 2 and 3. This liner is adapted to be positioned between the center plate 34 and the center plate 24. The liner includes a bowl-shaped body having a circular bottom that includes a load-bearing portion 52 and a conductive portion 53, each of which has contiguous upper and lower planar surfaces 54 and 56. The liner also includes a circumambient or cylindrical upstanding outer wall 58 that extends between the center plates. The upper end of the cylindrical wall 58 includes an annular bead or rim 60 which may take other forms in order to suitably fit a bolster bowl. At the inside edge of the rim 60, a bevel 61 is provided which facilitates the sliding of the body center plate 34 into the liner when the center plates are brought together. The upstanding wall 58 of the bowl-shaped liner serves to provide a bearing surface between the side wall 38 of the truck bolster bowl and the side wall 46 of the body bolster bowl 34. It will be appreciated that the disk-shaped bottom of the liner, particularly the load-bearing portion 52, supports the load of the car at the respective truck. The load-bearing portion 52 constitutes a substantial portion of the disk-shaped bottom of the liner. More particularly, the load-bearing portion as measured along a radius from the inner periphery of the center opening 62 to the outer edge of the bottom is about 80 percent of the radius plus the conductive portion 53 constitutes only about 20 percent of the disk-shaped bottom as it is measured along a radius from the inner periphery of the central kingpin receiving opening and the outer periphery of the bottom. In terms of area, the conductive portion is about ten percent of the entire area of the planar surface of the liner. At the very least, the conductive portion is sized to produce reliable electrical continuity between the center plates.

Although the conductive portion is also UHMWPE, that is carbon filled, because of the carbon fillers the conductive portion will not wear as well as or stand the load that is sustained by the load-bearing portion 52. It is only important that the conductive portion serve to assure electrical conductivity across the upper and lower surfaces of the conductive portion to essentially electrically connect the body bolster center plate with the truck bolster center plate which in turn connects the car body with ground to avoid the build-up of static electricity on the car.

It will be appreciated that the liner may be made of any suitable high molecular weight polymeric material including polyethylene, polypropylene, nylon, teflon, urethane, and the like, although it is preferable that it be made of polyethylene having an ultra-high molecular weight.

The liner of the invention is made by forging which comprises the preparation of segments from pill molds, joining the segments together in one mold, and then curing the material together under high heat and pressure. The conductive portion 53 is formed as an annulus in a pill mold where the UHMWPE is mixed in a batch with carbon particles and then placed in a pill mold and put under sufficient pressure so that the uncured plastic is held together. The polyethylene is in essentially powder or granular form and is mixed with carbon particles to form a batch of conductive uncured polyethylene for transfer to a pill mold. In the pill mold sufficient pressure is applied without heat to compress the uncured plastic into an annular shape that is a one-piece segment and transferrable to a forging mold. The load-bearing portions are formed in pie-shaped segments where the polyethylene is placed in a pill mold and again compressed under sufficient pressure in order to cause the material to maintain a form so that it can be transferred to a final mold. The uncured polyethylene for the load-bearing segments includes reinforcing particles to provide the desired strength and wearability, as well as to greatly resist cold flow. Thus, the initial segments are cold-compressed and then placed together in a single mold to form the liner having the conductive portion 53a and substantially equal pie-shaped segments 52a, 52b and 52c, as shown in FIGS. 2 and 3. When placed together in a single mold, the inner peripheries of the pie-shaped segments would be abutting the outer periphery of the annular conductive material segment. Thereafter, the mold is closed with an upper member. The mold is then subjected to sufficient heat and pressure to cause the curing of the polyethylene, at which time the adjacent edges of each pie-shaped section fuse together and the inner peripheries of the pie-shaped segment fuse with the carbon-filled annulus.

Due to the pressure that is applied in the final curing of the polyethylene segments, as seen in FIGS. 2 and 3, the seam 53b as viewed from the upper or lower planar surface of the liner which is disposed between the outer periphery of the conductive portion and the inner peripheries of the pie-shaped portions is irregular in shape. Similarly, under compression the vertical joint or seam 53c between the carbon or conductive portion 53 and the load-bearing portion 52 which extends between the upper and lower planar surfaces of the liner is irregularly shaped, as shown in FIG. 6. The irregular seams produced increase the area of fusion or connection between the conductive portion and the load-bearing portion to provide a much stronger seam or joint once the forging operation is completed, and to thereby avoid separation at the seam. As shown in FIGS. 2 and 3, three pie-shaped segments are illustrated to make the load-bearing portion of the liner. It can be appreciated that any number of segments may be made as long as the final product has an integrity such that the entire liner will be a monolithic structure. It has been found that three pie-shaped segments are satisfactory to construct the liner. As seen in FIGS. 2 and 3, the seam or joint between segments 52a and 52b is labeled 52d, while the joint between segments 52b and 52c is labeled 52e, and finally the joint between segments 52c and 52a is labeled 52f.

The load-bearing segments 52a, 52b and 52c of the liner comprise UHMWPE that is enhanced or reinforced by adding reinforcing particles, preferably glass particles. The choice of fillers for the polyethylene to provide reinforcing of the load-bearing portion and conductivity of the conductive portion together with the percentage of load-bearing portion relative to conductive portion and the manner in which the liner is made collectively contribute to the making of a liner that will serve at least one million miles before needing to be replaced. Since at least the load-bearing portion is self-lubricating, there is no need to add lubricants when installing the liner. Long service reduces maintenance costs while providing a liner for a center plate structure that will also reduce the wear of the center plate structure.

Another embodiment of the invention is shown in FIGS. 5 and 6, which basically incorporates the same technology as the bowl- or cup-shaped liner in FIGS. 2 to 4, except the liner as generally designated as 65 is a horizontal liner or a disk-shaped liner where it is not desired or needed to have an upstanding outer wall like the liner in the embodiment of FIGS. 2 to 4. The liner 65 includes a load-bearing portion 67 and a conductive portion 68 in substantially the same proportions as that of the bottom wall of the bowl-shaped liner of FIGS. 2 to 4. Similarly, the horizontal liner of FIG. 5 is made by making segments in pill molds including an annular conductive portion and a plurality of pie-shaped segments which are then later transferred to a mold that will apply heat and pressure to cure the polyethylene and produce the disk-shaped liner as a monolithic structure.

In view of the foregoing, it is particularly appreciated that the liner of the present invention satisfies the criteria for railway cars that need to have electrical continuity between the car body and the truck in order to avoid the buildup of static electricity, as well as to provide a more sturdy and strong self-lubricating liner that can withstand the rigorous abuse between a car body and a truck and reduce maintenance costs.

It will be understood that modifications and variations may be effected without departing from the scope of the novel concepts of the present invention, but it is understood that this application is to be limited only by the scope of the appended claims.

The invention is hereby claimed as follows:

1. In a center plate assembly on a railroad car wherein said assembly includes a car center plate, a truck center plate aligned with the center plate by a kingpin, and a self-lubricating plastic bearing liner between said center plates having upper and lower planar surfaces,
    the improvement in said plastic bearing liner which includes:
    a central opening for receiving said kingpin,
    an outer substantially annular non-conductive load-bearing portion, and
    an inner substantially annular electrically conductive portion integrally molded to said load-bearing portion and of substantially the same thickness as the load-bearing portion, both portions being disposed between and engaging both center plates with the conductive portion establishing electrical conductivity between the center plates,
    said outer and inner portions each having an upper and lower contact surface engaging said center plates,
    the total area of said upper contact surface of said outer portion being substantially larger than the total area of said upper contact surface of said inner portion,
    said load-bearing portion being of an ultra-high molecular weight polyethylene filled with reinforcing particles, and said conductive portion being of an ultra-high molecular weight polyethylene filled with conductive particles.

2. The liner of claim 1, wherein said liner is forged from a plurality of pill molded load-bearing segments arranged with a pill-molded conductive segment.

3. The liner of claim 1, wherein the liner is disk-shaped.

4. The liner of claim 1, wherein the liner is bowl-shaped.

5. The liner of claim 1, wherein the reinforcing particles in the bearing portion are glass particles.

6. The liner of claim 1, wherein the conductive particles in the conductive portion are carbon particles.

7. The liner of claim 1, wherein the conductive portion is about twenty percent (20%) of the liner as measured along a radial line extending between the inside periphery of the conductive portion to the outside periphery of the load-bearing portion.

8. The liner of claim 1, wherein the liner is forged from a plurality of preformed pill molded segments of uncured polyethylene including an annular segment defining the conductive portion and a plurality of pie-shaped segments defining the load-bearing portion.

9. A plastic bearing liner of UHMWPE for use between the center plates of a center plate assembly on a railroad car, said liner comprising:
    monolithically forged concentrically disposed load-bearing and conductive portions defining upper and lower planar center plate engaging surfaces,
    said conductive portion being centrally disposed to the load-bearing portion and annular in shape to define a central opening therethrough and including carbon particles to establish electrical conductivity between said planar surfaces, said load-bearing portion including glass particles to reinforce the portion and inhibit cold flow, and said load-bearing portion covering about ninety percent of said planar surfaces.

10. The liner of claim 9, wherein the liner is disk-shaped.

11. The liner of claim 9, wherein the liner is cup-shaped.

12. The liner of claim 9, wherein the area of the conductive portion relative to the total area of the planar surfaces of the liner is such as to provide reliable electrical continuity between the center plates over the life of the liner.

13. The liner of claim 9, wherein the area of the conductive portion is about ten percent of the entire planar area of both portions on each side.

14. The liner of claim 9, wherein the liner is forged from a plurality of preformed pill molded segments of uncured polyethylene including an annular segment defining the conductive portion and a plurality of pie-shaped segments defining the load-bearing portion.

* * * * *